May 23, 1961   L. A. MOREHEAD ET AL   2,985,185
AUTOMATIC VALVE CHANGE-OVER APPARATUS
Filed Dec. 12, 1955   2 Sheets-Sheet 1

INVENTORS.
LAUREL A. MOREHEAD
FRANCIS J. EICHELMAN
BY
ATTORNEY

May 23, 1961  L. A. MOREHEAD ET AL  2,985,185
AUTOMATIC VALVE CHANGE-OVER APPARATUS
Filed Dec. 12, 1955  2 Sheets-Sheet 2

INVENTORS
LAUREL A. MOREHEAD
BY FRANCIS J. EICHELMAN
ATTORNEY.

United States Patent Office 2,985,185
Patented May 23, 1961

2,985,185
AUTOMATIC VALVE CHANGE-OVER APPARATUS

Laurel A. Morehead, St. Paul, Minn., and Francis J. Eichelman, Brookfield, Ill., assignors to Chemetron Corporation, a corporation of Delaware Filed Dec. 12, 1955, Ser. No. 552,368

9 Claims. (Cl. 137—113)

This invention relates to an automatic valve change-over apparatus for use in a gas supply system. More specifically it comprises improved fully automatic apparatus for achieving, in a high pressure gas system, unattended and instantaneous change-over from a service source of supply to a reserve source of supply. This is desired to assure a continuous and unvarying flow of gas to the consumer line.

This invention is adapted to a variety of gas service systems. In the preferred embodiment illustrated, the apparatus is particularly adapted for oxygen service such as would be used in welding and cutting operations, or in the medical field for inhalation purposes. Its fully automatic, efficient, positive, and instantaneous action, as well as its compact construction and minimization of moving parts are among its chief attributes.

Attempts have been made in the past to achieve fully automatic change-over in gas flow control systems serving a consumer and supplied from alternately replenishable banks of cylinders or other supply sources. Almost without exception these efforts involved liquefied gas supplies in extremely low-pressure ranges such as, for example, liquid petroleum gas installations for home use, or carbon dioxide systems for extinguishing fires.

However, in none of these fields are there encountered the problems involved in the handling of oxygen either for industrial or medical purposes. In high pressure oxygen service, for example, extreme precautions must be taken to avoid the generation of excessive heat due to compression. Because high pressure oxygen systems inherently involve conditions favoring maximum combustion, substantial heat generation must be positively avoided, and the present invention achieves this effectively and simply.

Moreover, for the most part, prior gas system change-over expedients were only semi-automatic in operation. It is known to arrange in tandem two regulators set at differential pressures each being supplied by an alternate gas source. The regulator set for the higher pressure will cause its supply to feed to the consumer's line until such time as the pressure of the supply is depleted to a point equal to the lower setting of the second regulator, at which time the second regulator will take over automatically to feed from the alternate gas supply into the consumer's line. To this extent the change-over is automatic, but after the depleted supply has been replenished, the differential setting of the regulators must be manually restored. The change-over system of this invention provides a change-over valve that is fully automatic, and requires no resetting or manual readjustment to maintain a constant and unvarying flow to the user.

There is further provided in this system, pressure breakers in the nature of initial pressure reducing valves; a low pressure line regulator in which there is preferably embodied a novel pressure compensating arrangement such as described in detail in co-pending application Serial No. 45,120, filed July 25, 1960, by Francis J. Eichelman for Gas Pressure Regulator; a double acting check valve located intermediate the automatic change-over valve and the line regulator; and a pressure responsive signalling arrangement.

It is, therefore, a principal object of this invention to provide a highly efficient change-over apparatus and system that is fully automatic, providing economical and practical means for insuring a constant, uninterrupted, and unvarying supply of gas from alternate gas sources that are under high pressure, at least initially.

Another object of this invention is to provide a gas distribution system and change-over apparatus that is instantaneous and positive in operation to assure a constant line pressure.

Still another object is to provide a valve change-over apparatus involving a minimum number of moving parts and connections, resulting in a compact, safe unit requiring minimum maintenance.

Another object of this invention is to provide a novel and improved apparatus and system for automatically switching into service on exhaustion of one gas supply source, a fully charged high pressure cylinder, or group of such cylinders manifolded together, or any other bulk supply, without the necessity for resetting the controls, or other manual adjustment.

Yet another object resides in the provision of a system having pressure breakers in the nature of initial pressure reducing valves; a low pressure line regulator; a double acting check valve located intermediate the automatic change-over valve and the line regulator; and a pressure responsive signalling arrangement.

Additional objects and advantages of this invention will become more apparent as the following description proceeds, taken in conjunction with the accompanying drawings wherein.

Figure 1:
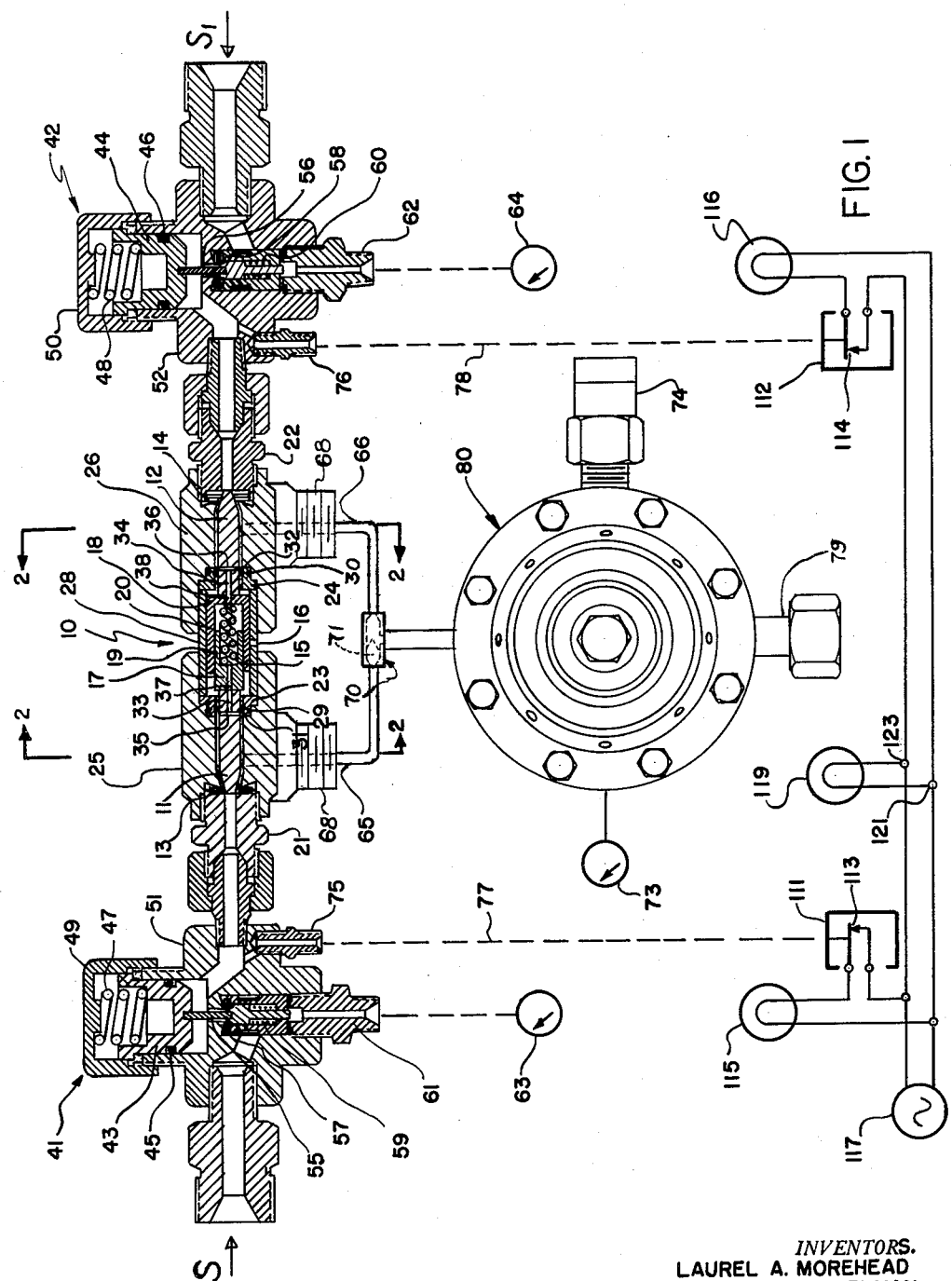
Figure 1 is a plan view of the change-over valve apparatus partly in longitudinal section, and further illustrates schematically the entire control system.

Referring now more particularly to Figure 1 of the drawings, the construction of the change-over valve 10 is such that either source of supply indicated at S and $S_1$, may be used first, the valve automatically selecting as the service supply the first source from which pressure is applied to the valve.

Normally each gas source, S and $S_1$, is provided with a hand operated valve (not shown). Before such a valve of either supply source is opened a pair of slidable cylindrical valve plungers 11 and 12 are seated in respective valve seats 13 and 14 due to a force exerted against them by a compression spring 15 through the end walls 17 and 18 of a pair of concentric slidably nested, or telescoping, cylindrical slides 19 and 20. The valve seats 13 and 14 are preferably of non-metallic material such as, for example, nylon or Teflon, and are set in annular recesses in seat assemblies 21 and 22.

For the purpose of illustration, assume that the high pressure source of supply, S, connected to the left side of the change-over valve 10, as viewed in Figure 1, is put into service first. Gas, such as oxygen, under an initial pressure in the range of 2000 to 2600 pounds per square inch, depending on the size and construction of the supply source, enters the inlet of an initial pressure breaking device 41 in the nature of a pressure reducing regulator. The other side of the valve 10 is provided with a similar device 42.

The pressure reducing regulators 41 and 42 are for the most part of the conventional stem type, but differ in that slidable plungers 43 and 44, provided preferably with "quad" type sealing rings 45 and 46, of any suitable material such as neoprene, are employed rather than a conventional diaphragm. Springs 47 and 48 are provided between the plungers 43 and 44, and caps 49 and 50, respectively. The caps 49 and 50 are threadably engaged with bonnets 51 and 52 of the regulators 41 and 42. Inward adjustment of the caps 49 and 50 affects the bias value of the compression springs 47 and 48 to set the regulators to deliver a pre-selected delivery pressure.

The regulators 41 and 42 are further provided with conventional stems 55 and 56, respectively. The valve seats 57 and 58 are preferably of non-metallic material such as, for example, nylon or Teflon. Compensating springs 59 and 60 are of pre-selected tension. The regulators 41 and 42 have fittings 61 and 62 each of which communicates with high pressure gauges 63 and 64, respectively, as schematically illustrated in Fig. 1.

In the oxygen system illustrated, the pressure reducing regulators 41 and 42 are set to deliver about 160 p.s.i. at full source pressure. This reduction in pressure is a precaution against the possibility of "firing" of the valve seats 13 and 14 due to heat of compression.

After undergoing the initial reduction in pressure in regulator 41 the gas passes from the regulator and exerts pressure against the tapered end of the slidable valve plunger 11 causing it and the abutting nested slide 19 to move against the bias of the spring 15 to unseat the tapered end of the plunger 11 from its valve seat 13. The valve plungers 11 and 12 are respectively provided with guides 23 and 24 secured within respective valve housings 25 and 26 by the abutting ends of a connector sleeve 28 to which the valve housings 25 and 26 are secured. The valve plungers 11 and 12 are also provided with sealing rings 31 and 32 in annular recesses in the guides 23 and 24. The valve plungers 11 and 12 furthermore are provided with longitudinal passages 33 and 34, and transverse intersecting passages 35 and 36, respectively. Cooperating with these passages, the end walls 17 and 18 of the nested slides 19 and 20 are provided with passages 37 and 38 which are aligned with passages 33 and 34.

The passages of the valve plungers 11 and 12, the slides 19 and 20, together with an orifice 16 in the connector sleeve 28 prevent any possibility of a pressure lock-up occurring in valve 10. For instance, when the valve plunger 11 is seated, the transverse passage 35 is upstream of sealing member 31. Therefore, the annular space about the valve plunger 11 is vented to atmosphere. However, at the instant the valve plunger 11 is unseated by gas flowing from the regulator 41, the annular space surrounding the valve plunger 11 is filled with gas and a small amount enters the passage 35 before this passage is displaced downstream of the sealing ring 31 as the valve plunger 11 is unseated. The small amount of gas that enters the passage 35 before it is sealed off as the valve is unseated then passes to atmosphere via the orifice 16. A similar operation occurs when the valve plunger 12 is activated by gas flowing from a reserve supply, $S_1$.

After the chosen gas supply is thus placed in service through the valve seat 13, the reserve gas source, $S_1$, may then be communicated to the other valve plunger 12 and seat 14. The force exerted by the reserve source on the relatively small exposed area of the valve plunger 12, in addition to the small force exerted by the bias of spring 15, is insufficient to overcome the force exerted by the gas flowing from the service supply, S, on the greater exposed area of the unseated valve plunger 11. The valve plunger 12, therefore, remains firmly seated in its valve seat 14 until the service gas supply nears exhaustion as will be described later.

Figure 2:
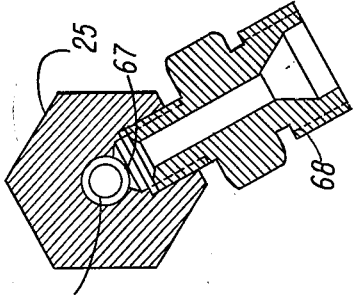
Figure 2 is a transverse section taken on lines 2—2 of Figure 1.
Figure 3:
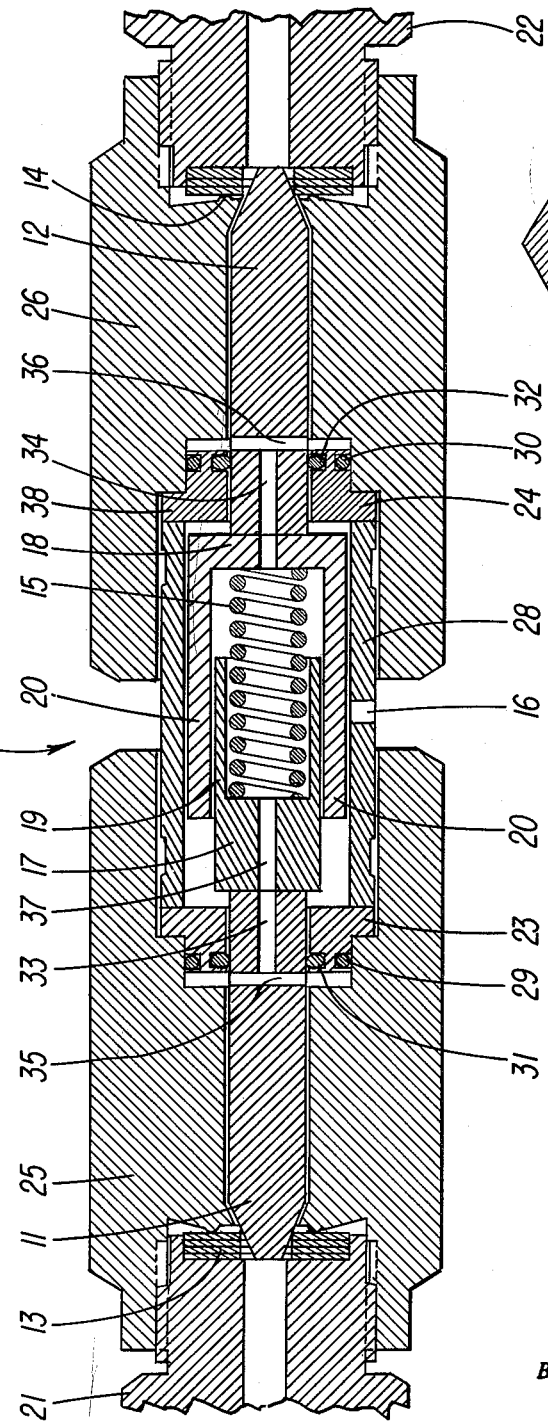
Figure 3 is an enlarged view of a portion of Figure 1 showing details of the change-over valve apparatus.

Again returning to the valve plunger 11 and seat 13, gas flows through the valve seat 13, the annular space about the unseated valve plunger 11 and through an outlet 67 (see Fig. 2) communicating with a nipple 68 threadably engaged with the housing 25. The valve members 12 and 14 are provided with a similar outlet arrangement with respect to the housing 26.

Conduit means schematically illustrated at 65 in Fig. 1 conveys the gas to a check valve such as the double acting check valve 70 provided with a common outlet connected to the inlet of a line regulator 80. The check valve 70 may be provided as shown with tapered valve seats and a correspondingly shaped pressure responsive stem 71. The valve 70 cooperates with the seated valve members 11 and 13, or 12 and 14, of the change-over valve 10, to insure against pressure equalization between the service and reserve sources of supply in the event that the reserve valve pair of the change-over valve 10 should for some reason not be properly seated.

The line regulator 80 of the system is preferably a stem type regulator provided with a novel pressure compensating arrangement for counterbalancing, against a substantially uniform standard pressure, the forces tending to affect fluid flow through the regulator. A regulator provided with such a novel arrangement is described in detail in the aforementioned co-pending patent application filed by Francis J. Eichelman.

Completing the normal accessories to a regulator, a low pressure gauge 73 (see Fig. 1) is provided in addition to a relief valve 74.

Returning now to the operation of the system, when the pressure from the service supply source, S, falls below a predetermined delivery pressure of the pressure breaking regulator 41, in this illustration, about 70 p.s.i., the force on the valve member 12 exerted by a reserve source, $S_1$, through the pressure breaking regulator 42, is sufficient to overcome the force exerted by the nearly depleted service supply, and the spring 15, to unseat the valve 12 and firmly reseat the valve plunger 11 in the manner previously described. Gas then flows through the outlet in the housing 26, through the conduit means 66, through the check valve 70, and the line regulator 80 to the delivery line 79. As a result, the pressure in the delivery or consumer's line 79 undergoes substantially no variance in the change-over. The action is instantaneous, and would be unnoticed except for a slight passage of gas that would otherwise have locked up about the spring 15, through the orifice 16 in the connector sleeve 28, and a signal to be described below.

A mercury contact pressure switch 111 is connected to an outlet 75 of the pressure reducing regulator 41 by conduit means 77. The mercury contact pressure switch 111 is pre-set to close an electric circuit when the pressure delivered by the pressure reducing regulator 41 falls below the predetermined value. When the circuit is closed at its contacts, schematically illustrated at 113, an incandescent lamp 115 is energized from a source of current schematically shown at 117. The energized lamp indicates to the consumer that the service supply source, S, has been exhausted and requires replenishment. Other indicia, visual or audible, or both, may be provided at various locations as desired. A similar mercury contact switch 112, provided with a pair of contacts 114, and an incandescent lamp 116, are connected to the outlet 76 of the other pressure breaking regulator 42 through a conduit 78. When the reserve supply, $S_1$, is depleted this incandescent lamp will light in the manner described for lamp 115 and the valve 10 will automatically change over to the other gas source previously replenished. Lamps 115 and 116 are conversely deenergized by the pressure switches when their respective supply sources are restored.

Once the described system has been put into operation, the consumer need only replace the exhausted supply sources as indicated. No manual adjustments of the apparatus are required.

Due to the fact that this system is advantageously utilized in hospital and like piping systems where failure involves human life, in the unlikely event of a breakdown in the system, provision may be made for a manual emergency connection to a third source of supply to feed directly into the delivery or consumer line for use while repairs are being effected.

It will be understood that this invention resides in the novel combination, arrangement, and adaptation of parts, and that such modifications as will suggest themselves to those skilled in the art and which come within the spirit of this invention are included within its scope as defined by the appended claims.

We claim:

1. A gas flow control system for effecting fully automatic change-over from a substantially depleted gas supply source to another source of gas supply, comprising a pair of valves each provided with a valve plunger, a pressure reducing valve upstream of each of said valves adapted for communication with the respective gas supply sources and set to deliver a preselected pressure, double acting slidable means adapted to respond to fluid pressure exerted against the valve members and cooperating therewith alternately to maintain one valve closed while the other valve is open, said slidable means including slidably nested members abutting said valve plungers, a third pressure reducing valve for connection with a delivery line, and conduit means communicating the outlets of said valves with the inlet of said third pressure reducing valve.

2. A gas flow control system for effecting fully automatic change-over from a substantially depleted gas supply source to another source of gas supply, comprising a pair of valves each provided with a valve plunger, a pressure reducing valve upstream of each of said valves adapted for communication with the respective gas supply sources and set to deliver a preselected pressure, double acting slidable means adapted to respond to fluid pressure exerted against the valve members and cooperating therewith alternately to maintain one valve closed while the other valve is open, said slidable means including slidable nested members abutting said valve plungers, and a spring within said slidable means coacting with fluid pressure to effect an instantaneous and positive change-over to another source of supply when the service source of supply has depleted to near exhaustion, a third pressure reducing valve for connection with a delivery line, and conduit means communicating the outlets of said valves with the inlet of said third pressure reducing valve.

3. A gas flow control system for effecting fully automatic change-over from a substantially depleted gas supply source to another source of gas supply, comprising a pair of valves each provided with a valve plunger, a pressure reducing valve upstream of each of said valves adapted for communication with the respective gas supply sources and set to deliver a preselected pressure, double acting slidable means adapted to respond to fluid pressure exerted against the valve members and cooperating therewith alternately to maintain one valve closed while the other valve is open, said slidable means including slidably nested members abutting said valve plungers, and a spring within said slidable means coacting with fluid pressure to effect an instantaneous and positive change-over to another source of supply when the service source of supply has depleted to a preselected near depletion value, passage means in said valve plungers communicating with passage means in said slidable members for passage of gas to the atmosphere for preventing a pressure lock-up in the change-over mechanism, a third pressure reducing valve for connection with a delivery line, and conduit means communicating the outlets of said valves with the inlet of said third pressure reducing valve.

4. A gas flow control system for effecting fully automatic change-over from a substantially depleted gas supply source to another source of gas supply, comprising a pair of valves each provided with a valve plunger, a pressure reducing valve upstream of each of said valves adapted for communication with the respective gas supply sources and set to deliver a preselected pressure, double acting slidable means adapted to respond to fluid pressure exerted against the valve members and cooperating therewith alternately to maintain one valve closed while the other valve is open, said slidable means including slidably nested members abutting said valve plungers, and a spring within said slidable means coacting with fluid pressure to effect an instantaneous and positive change-over when the service source of supply has depleted to a preselected near depletion value, passage means in said valve plungers communicating with passage means in said slidable members for passage of gas to the atmosphere for preventing a pressure lock-up in the change-over mechanism, a third pressure reducing valve for connection with a delivery line, conduit means communicating the outlets of said valves with the inlet of said third pressure reducing valve, a simple double acting pressure responsive check valve in said conduit means, and signalling means operable in response to a preselected pressure not greater than the presetting of the preset reducing valves to indicate the condition of the respective supply sources.

5. In an automatic change-over device, the combination comprising a plurality of valve housings each having an inlet and an outlet and a valve plunger, a valve seat for each of said valve plungers, a sleeve connecting said valve housings, slidable means between said valve plungers and adapted to respond to fluid pressure exerted against the valve members and cooperating therewith alternately to maintain one valve closed while the other is open, and a spring within said slidable means for normally biasing said valve plungers in a seated position, and in cooperation with fluid pressure for maintaining one valve closed until the source passing through the unseated valve reaches a preselected near depletion value.

6. In an automatic change-over device, the combination comprising a plurality of valve housings each having an inlet and an outlet and a valve plunger, a valve seat for each of said valve plungers, a sleeve connecting said valve housings, said sleeve provided with an orifice communicating the internal of the sleeve with the atmosphere, slidable means between said valve plungers and adapted to respond to fluid pressure exerted against the valve members and cooperating therewith alternately to maintain one valve closed while the other is open, said slidable means including slidably nested members abutting said valve plungers, and a spring within said slidable means normally biasing said valve plungers in a seated position, and in cooperation with fluid pressure, for maintaining one valve closed until the source passing through the unseated valve reaches a preselected near depletion value.

7. In an automatic change-over device, the combination comprising a plurality of valve housings each having an inlet and an outlet and a valve plunger, a valve seat for each of said valve plungers, a sleeve connecting said valve housings, said sleeve provided with an orifice communicating the internal of the sleeve with the atmosphere, slidable means between said valve plungers and adapted to respond to fluid pressure exerted against the valve members and cooperating therewith alternately to maintain one valve closed while the other is open, said slidable means including slidably nested members abutting said valve plungers, passage means in said valve plungers communicating with additional passages in said slidable means for passage of gas to the atmosphere for preventing a pressure lock-up in the automatic change-over mechanism, and a spring within said slidable means coacting with fluid pressure to effect an instantaneous and positive change-over to another supply source when the service source of supply reaches a preselected near depletion value.

8. In an automatic change-over device, the combination comprising a plurality of valve housings each having an inlet and an outlet and a valve plunger, a valve seat for each of said valve plungers, a sleeve connecting said valve housings, said sleeve provided with an orifice communicating the internal of the sleeve with the atmosphere, slidable means between said valve plungers and adapted to respond to fluid pressure exerted against the valve members and cooperating therewith alternately to maintain one valve closed while the other is open, said slidable means including slidably nested members abutting said valve plungers, passage means in said valve plungers communicating with additional passages in said slidable means for passage of gas to atmosphere for preventing a pressure lock-up in the automatic change-over mechanism, sealing means associated with said passage means and adapted to seal off said passage means from communicating to atmosphere in one position of the plunger and to permit said passage means to communicate with the atmosphere in another position of the plunger, and a spring within said slidable means coacting with fluid pressure to effect an instantaneous and positive change-over to another supply source when the service source of supply reaches a preselected near depletion value.

9. In an automatic change-over device as claimed in claim 8, said passage means in each valve plunger comprising a longitudinal passage and an intersecting transverse passage, sealing means associated with said transverse passage for closing said passage means from communication with fluid flowing from the service source of supply when said transverse passage is downstream of said sealing means, and to permit said passage means to communicate with the atmosphere when said transverse passage is upstream of said sealing means whereby a pressure lock-up in the automatic change-over mechanism is prevented.

References Cited in the file of this patent

UNITED STATES PATENTS

| | | |
|---|---|---|
| 861,038 | Lewis | July 23, 1907 |
| 1,737,428 | Mercur | Nov. 26, 1929 |
| 1,887,578 | Bush | Nov. 15, 1932 |
| 2,091,051 | Mesinger | Aug. 24, 1937 |
| 2,212,210 | Mesinger | Aug. 20, 1940 |
| 2,257,249 | Thomas | Sept. 30, 1941 |
| 2,316,373 | Thomas | Apr. 13, 1943 |
| 2,389,667 | Hudson | Nov. 27, 1945 |
| 2,517,534 | Courtot | Aug. 8, 1950 |
| 2,518,894 | Siebens | Aug. 15, 1950 |
| 2,768,640 | Zimmer | Oct. 30, 1956 |